United States Patent [19]  [11] Patent Number: 4,803,259
Zboril et al.  [45] Date of Patent: Feb. 7, 1989

[54] ISOPROPANOLAMINES AS CATALYST DEACTIVATORS IN SOLUTION PROCESS FOR POLYMERIZATION OF ALPHA-OLEFINS

[75] Inventors: Vaclav G. Zboril; David J. Mitchell, both of Kingston, Canada

[73] Assignee: Du Pont Canada Inc., Mississauga, Canada

[21] Appl. No.: 41,248

[22] Filed: Apr. 22, 1987

[30] Foreign Application Priority Data

Apr. 25, 1986 [GB] United Kingdom ............... 8610126

[51] Int. Cl.$^4$ .......................... C08F 6/02; C08F 6/10
[52] U.S. Cl. .................................... 528/483; 528/485; 528/486; 528/491; 528/492; 526/352; 524/249
[58] Field of Search ............... 528/492, 491, 483, 485, 528/486; 526/83, 352; 524/249

[56] References Cited

U.S. PATENT DOCUMENTS

| | | | |
|---|---|---|---|
| 3,004,963 | 10/1961 | Bartolomeo et al. | 528/492 |
| 3,208,987 | 9/1965 | Reid | 528/492 X |
| 3,547,855 | 12/1970 | Loveless | 528/492 |
| 3,644,321 | 2/1972 | Koga et al. | 528/492 X |
| 3,773,743 | 11/1973 | Ainsworth, Jr. et al. | 528/495 X |
| 3,803,113 | 4/1974 | Gluntz et al. | 528/492 X |
| 4,242,500 | 12/1980 | Franceschini | 528/492 |
| 4,430,488 | 2/1984 | Zboril | 528/486 X |

Primary Examiner—Joseph L. Schofer
Assistant Examiner—F. M. Teskin

[57] ABSTRACT

A solution polymerization process for the preparation of high molecular weight polymers of alpha-olefins is disclosed. In the process, the coordination catalyst is deactivated using a solution of at least one trialkanolamine deactivating agent of the formula N(ROH)(R'OH)$_2$ where R is isopropyl and R' is alkyl of 2–4 carbon atoms, especially ethyl or isopropyl. The process is capable of producing polyers of improved color.

11 Claims, No Drawings

ISOPROPANOLAMINES AS CATALYST DEACTIVATORS IN SOLUTION PROCESS FOR POLYMERIZATION OF ALPHA-OLEFINS

The present invention relates to the deactivation of the polymerization catalyst in a solution process for the polymerization of alpha-olefins, especially ethylene or mixtures of ethylene and higher alpha-olefins. In particular, the present invention relates to such deactivation in a process in which deactivated catalyst is not separated from the polymer.

Polymers of ethylene, especially, homopolymers of ethylene and copolymers of ethylene and higher alpha-olefins, are used in large volumes for a wide variety of end uses, for example, in the form of film, fibres, moulded or thermoformed articles, pipe, coatings and the like.

Processes for the preparation of homopolymers of ethylene and copolymers of ethylene and higher alpha-olefins are known. A particularly preferred process for the polymerization of alpha-olefins is the high temperature or "solution" polymerization process, an example of which is described in Canadian Pat. No. 660,869 of A. W. Anderson, E. L. Fallwell and J. M. Bruce, which issued Apr. 09, 1963. In a solution process the process parameters are selected in such a way that both the monomer and polymer are soluble in the reaction medium. Under such conditions accurate control over the degree of polymerization, and hence the molecular weight of the polymer obtained, may be achieved, for example, by control of the reaction temperature. Solution processes are also discussed in European patent publication No. 193,262 of V. G. Zboril, published Sept. 03, 1986.

The polymerization reaction in a solution polymerization process is normally terminated by addition of a so-called "deactivator". A wide variety of compounds are capable of deactivating the coordination catalyst, especially at the high temperatures used in a solution polymerization process. However, a deactivator must meet other, more stringent, criteria in order to be acceptable for use in a commercial process. For instance, if a so-called catalyst removal process is used, both the deactivated catalyst residues and the deactivator must be capable of being removed from the reaction mixture in such a removal process. If the deactivated catalyst remains in the polymer, the deactivator and deactivated catalyst residues must not cause problems in the separation of polymer from solvent and unreacted monomers, in the processing of the polymer obtained and in the resultant fabricated articles. In any event, the polymer must have commercially-acceptable colour, odour and toxicity properties. It is particularly difficult to assess the possible effects of a potential deactivator at the high temperatures attained in a solution polymerization process, especially with regard to isomerization of comonomers, degradation of the deactivator, generation of coloured species, reaction with antioxidants and other stabilizers and the like. Moreover, the behavior of the deactivator may be quite sensitive to changes in the operation of a solution process.

Deactivators for solution polymerization processes are usually admixed with hydrocarbon solvent, normally the solvent of the polymerization process, and fed into the polymerization mixture, usually shortly after that mixture passes from the reactor. Such processes are disclosed in, for instance, the aforementioned publication of V. G. Zboril and in Canadian Pat. No. 732,279 of B. B. Baker, K. M. Brauner and A. N. Oemler, which issued Apr. 12, 1966.

Coordination catalyst containing vanadium may conveniently be deactivated by contacting the polymerization mixture with a solution of a salt of an alkaline earth metal or zinc and an aliphatic monocarboxylic acid dissolved in the hydrogen solvent used in the polymerization process. Such deactivation of coordination catalysts containing vanadium tends to result in polymer of improved colour, as is disclosed in Canadian Pat. No. 1,165,499 of V. G. Zboril, which issued Apr. 10, 1984. Coordination catalysts may also be deactivated by sequentially contacting the polymerization mixture with a nitrogenous base, optionally in the form of an aqueous solution, water, carbon, dioxide, carbon monoxide, dialkyl carbonate or dioxolones, and then a solution of a salt of an alkaline earth metal or zinc and aliphatic monocarboxylic acid dissolved in a hydrocarbon solvent, as is disclosed in Canadian Pat. No. 1,173,599 of M. A. Hamilton, D. A. Harbourne and V. G. Zboril, which issued Aug. 28, 1984 and in published European patent applications No. 193,261 of D. J. Mitchell and V. G. Zboril and No. 193,263 of V. G. Zboril and R. A. Zelonka, both published Sept. 03, 1986.

The addition of alkanolamines, including triisopropanolamine and N,N-bis-(2-hydroxymethyl)soyamine, to polyolefins subsequent to catalyst deactivation and separation of polymer from solvent is disclosed in U.S. Pat. No. 4,454,270 of W. Kolodchin et al., which issued June 12, 1984. The use of triethanolamine for improving the colour of polyolefins is disclosed in U.S. Pat. No. 3,773,743 of O. C. Ainsworth et al., which issued Nov. 20, 1973. The use of diethanolamines in polyolefin compositions is disclosed in U.S. Pat. No. 3,349,059 of G. R. Lappin, which issued Oct. 24, 1967 and in U.S. Pat. No. 3,389,119 of R. W. Sherrill, which issued June 18, 1968.

It has now been found that the colour of the polymer obtained may be improved if the polymerization mixture is deactivated with at least one trialkanolamine, as defined herein below.

Accordingly, the present invention provides a solution polymerization process for the preparation of high molecular weight polymers of alpha-olefins selected from the group consisting of homopolymers of ethylene and copolymers of ethylene and $C_3$–$C_{12}$ hydrocarbon alpha-olefins, said process comprising feeding monomer selected from the group consisting of ethylene and mixtures of ethylene and at least one $C_3$–$C_{12}$ hydrocarbon alpha-olefin, a coordination catalyst and inert hydrocarbon solvent to a reactor, said catalyst being a titanium-based and/or vanadium-based coordination catalyst, polymerizing said monomer at a temperature of up to 320° C. and a pressure of less than 25 MPa, deactivating the catalyst by admixing the solution so obtained with at least one trialkanolamine deactivating agent of the formula $N(ROH)(R'OH)_2$, where R is isopropyl and R' is alkyl of 2–4 carbon atoms, separating the hydrocarbon solvent and other volatile matter from the resultant solution and recovering a composition of said high molecular weight polymer, the amount of deactivating agent being not more than 2.5 moles of deactivating agent per mole of halogen plus alkyl radicals in the coordination catalyst.

In a preferred embodiment of the present invention, trialkanolamine is the sole deactivator.

In another embodiment, the coordination catalyst is deactivated by sequentially admixing said solution with trialkanolamine followed by a solution of a salt of an alkaline earth metal or zinc with aliphatic monocarboxylic acid dissolved in hydrocarbon solvent.

In yet another embodiment, the coordination catalyst is deactivated by admixing with said solution (a) a minor amount of a deactivating agent selected from the group consisting of water, a nitrogenous base, carbon dioxide, carbon monoxide, dialkyl carbonate and dioxolones, and mixtures thereof, and (b) trialkanolamine, optionally admixed with a solution of a salt of an alkaline earth metal or zinc with aliphatic monocarboxylic acid dissolved in hydrocarbon solvent. The minor amount of deactivating agent viz. (a) above, and the trialkanolamine viz. (b) above, may be admixed together prior to being admixed with the solution passing from the reactor but in preferred embodiments (a) and (b) are simultaneously admixed with the solution passing from the reactor or sequentially admixed with the solution in either order. The nitrogenous base is of the formula $NR^2R^3R^4$, where $R^2$, $R^3$ and $R^4$ are independently selected from the group consisting of H, saturated alkyls having 1-20 carbon atoms and $-SiR^5R^6R^7$ where each $R^5$, $R^6$ and $R^7$ is independently selected from saturated alkyls having 1-20 carbon atoms, with the proviso that the nitrogenous base does not contain more than two $-SiR^5R^6R^7$ groups. The dialkyl carbonate has 3-20 carbon atoms and the dioxolones have 3-20 carbon atoms.

In a further embodiment, both of the R' groups of the trialkanolamine are the same, being isopropyl or ethyl. Alternatively, a mixture of trialkanolamines may be used, especially a mixture of trialkanolamines having both R' groups as isopropyl, both R' groups as ethyl and with one R' group being isopropyl and the other ethyl.

The present invention is directed to a solution polymerization process for the preparation of high molecular weight polymers of alpha-olefins. In particular the polymers of alpha-olefins are homopolymers of ethylene or copolymers of ethylene and hydrocarbon alpha-olefins, especially such alpha-olefins having 3 to 12 carbon atoms i.e. $C_3-C_{12}$, and especially $C_4-C_{12}$, alpha-olefins, including bicyclic alpha-olefins, examples of which are propylene, butene-1, hexene-1, octene-1 and bicyclo-(2,2,1)2-heptene. In addition cyclic endomethylenic dienes may be fed to the process with the ethylene or mixtures of ethylene and $C_3-C_{12}$ alpha-olefin, as described in Canadian Pat. No. 980,498 of C. T. Elston, which issued Dec. 23, 1975.

In a solution polymerization process of the present invention, monomer, a coordination catalyst and inert hydrocarbon solvent are fed to a reactor. Coordination catalysts for solution polymerization processes are known, for example those described in the aforementioned Canadian Pat. No. 660,869, in Canadian Pat. No. 1,119,154 of A. N. Mollison and V. G. Zboril, which issued Mar. 02, 1982 and in European patent publication No. 131,420 of M. A. Hamilton D. A. Harbourne, C. G. Russell, V. G. Zboril and R. A. Mulhaupt, published Jan. 16, 1985. Such coordination catalysts may be titanium-based and/or vanadium based catalysts, especially titanium-based or titanium/vanadium-based catalysts in which 20-100% of the transition metal is titanium. The monomer is ethylene or a mixture of ethylene and one or more of the higher alpha-olefins.

Solution polymerization processes may be operated at temperatures of up to 320° C. and especially in the range 105°-310° C., the lower temperature being above the lowest solubilization temperature of the polymer, as will be understood by those skilled in the art of solution polymerization processes. The pressures used in the process of the present invention are those known for solution polymerization processes viz. less than 25 MPa and especially in the range of about 4-25 MPa. The pressure and temperature are controlled so that both the unreacted monomers and the polymer formed remain in solution.

The hydrocarbon solvent used in the polymerization process is a hydrocarbon solvent that is inert with respect to the coordination catalyst. Such solvents are known and include hexane, heptane, octane, cyclohexane, methylcyclohexane and hydrogenated naphtha. The solvent used in the polymerization process is preferably also used in the preparation of the coordination catalyst. The hydrocarbon solvent is the major component of the polymerization mixture fed to the reactor, usually comprising at least 60% by weight of the reaction mixture. In the process, the monomer is dissolved in the solvent.

The mixture that passes from the polymerization reactor comprises polymer, unreacted monomers, coordination catalyst some of which remains in an active state, and hydrocarbon solvent. A deactivator is added to the mixture to terminate the polymerization process.

In the process of the present invention, the deactivator is at least one trialkanolamine of the formula $N(ROH)(R'OH)_2$, where R is isopropyl and R' is alkyl of 2-4 carbon atoms. In a preferred embodiment both of the R' groups are the same, being either ethyl or isopropyl. Alternatively, the trialkanolamine may be a mixture of trialkanolamines, especially a mixture of a trialkanolamine having both R' groups as isopropyl, a trialkanolamine having both R' groups as ethyl and a trialkanolamine having one R' group as isopropyl and the other as ethyl. Triisopropanolamine is the preferred deactivator.

The trialkanolamine(s) will usually be fed into the polymerization process in the form of a solution in hydrocarbon solvent, normally the same hydrocarbon solvent as is fed to the polymerization reactor. If a different solvent is used, it must be compatible with the solvent used in the polymerization process, not cause precipitation of any component of the polymerization mixture and not cause adverse effects on the solvent recovery system associated with the polymerization process.

Trialkanolamine may be the sole deactivator used in the polymerization process. Alternatively, the coordination catalysts may be deactivated by sequentially admixing with the solution passing from the polymerization reactor (a) at least one trialkanolamine and (b) a solution of a non-stoichiometric salt of an alkaline earth metal or zinc with an aliphatic monocarboxylic acid dissolved in hydrocarbon solvent, especially a salt having excess acid to facilitate solubility.

The salt of the second deactivator solution must be dissolved in the solvent in order to obtain intimate contact between the deactivator and the product of reaction of catalyst with the first deactivator, and to obtain uniform dispersion of the deactivator and catalyst residues i.e. the form of the catalyst after deactivation, throughout the polymer, thereby facilitating the production of polymer of uniform properties.

In the salt of the second deactivator solution, the metal is an alkaline earth metal or zinc, especially magnesium or calcium. The remainder of the salt is derived from at least one aliphatic carboxylic acid, especially such an acid having 6 to 20 carbon atoms. In a preferred embodiment the acid has 8 to 12 carbon atoms. The acid is preferably a branched chain aliphatic acid although straight chain aliphatic acids and cycloaliphatic acids may be used. Moreover, the acids may be saturated or unsaturated acids. However, the acid must be such that the salt thereof that is used in the process of the present invention is soluble in the hydrocarbon solvent used therein. In preferred embodiments the salt is calcium 2-ethyl hexanoate, calcium naphthenate, calcium isostearate or the like.

In an alternative embodiment, the solution passing from the polymerization reactor is deactivated with (a) a minor amount of a first deactivator and (b) trialkanolamine, optionally admixed with the salt of an alkaline earth metal or zinc with an aliphatic monocarboxylic acid described hereinabove. In this embodiment, the first deactivator may be a minor amount of water or of a nitrogenous base. The minor amount of deactivating agent viz. (a) above, and the trialkanolamine viz. (b) above, may be admixed together prior to being admixed with the reaction solution to deactivate the coordination catalyst, but in preferred embodiments (a) and (b) are simultaneously admixed with the reaction solution or independently admixed with that solution in either order.

The nitrogenous base is of the formula $NR^2R^3R^4$ where $R^2$, $R^3$ and $R^4$ are independently selected from the group consisting of H, saturated alkyls having 1–20 carbon atoms and $-SiR^5R^6R^7$ where each of $R^5$, $R^6$ and $R^7$ is independently selected from saturated alkyls having 1–20 carbon atoms, with the proviso that the nitrogenous base does not contain more than two $-SiR^5R^6R^7$ groups. Preferably, each of $R^2$, $R^3$ and $R^4$ is H i.e. the nitrogenous base is ammonia. In a preferred embodiment, the nitrogenous base is in the form of an aqueous solution in which the ratio of water to nitrogenous base is not greater than 5. In embodiments, at least one of $R^2$, $R^3$ and $R^4$ is methyl or ethyl. Alternatively, the deactivator of (a) above may be carbon dioxide, carbon monoxide, a dialkyl carbonate having 3–20 carbon atoms, especially dimethyl carbonate or diethyl carbonate, or a dioxolone which has 3–20 carbon atoms. The preferred dioxolone is 1,3-dioxolan-2-one. Mixtures of deactivators may be used. In the event that the polymerization reaction involves the use of a comonomer, it is possible that some of the deactivators will be less preferred than other deactivators e.g. dioxolones and diethyl carbonate may cause isomerization of comonomers that are capable of being isomerized.

The amount of first deactivating agent, or of trialkanolamine if it is the sole deactivating agent, is not more than 2.5 moles of deactivating agent per mole of halogen plus alkyl radicals in the coordination catalyst; as used herein a mole of catalyst component such as diethyl aluminum chloride, as used in the preparation of the catalyst, is deemed to contain two equivalents of ethyl groups and one equivalent of chlorine, the sum of such equivalents being referred to as "moles of halogen plus alkyl groups", and the calculation of the amount of the deactivating agent is to be made on such a basis. Preferably 0.25–1.5 moles of such deactivator are added per mole of halogen plus alkyl radicals in the catalyst.

In the process of the present invention the thus deactivated and treated polymerization mixture is fed to a separator, which may be a multistage separator, to separate unreacted monomer, hydrocarbon solvent and any other volatile matter from the polymer. In contrast to the usual practice in a solution process, no steps are taken to remove catalyst residues from the polymer using adsorbents or other techniques. After separation from solvent and unreacted monomer, the polymer may be extruded into water and cut into pellets or other suitable comminuted shapes.

The recovered polymer may then be treated with saturated steam, optionally admixed with air, at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range of 0.25:1 to 1:1 with the total amount of antioxidant being in the range of 400 to 2000 ppm. Examples of suitable hindered phenolic antioxidants are octadecyl-3,5,di-tert.butyl-4-hydroxy cinnamate, tetrakismethylene-3-(3',5'-di-tert.butyl-4-hydroxyphenyl)propionate methane and octadecyl-3-(3,5-di-tert.butyl-4-hydroxyphenyl)propionate. Examples of secondary antioxidants are di(stearyl)pentaerythritol diphosphite, tris(2,4-di-tert.butyl phenyl)phosphite, dilauryl thiodipropionate and bis(2,4-di-tert.butyl phenyl)pentaerythritol diphosphite.

In addition to antioxidants, other stabilizers especially stabilizers against the effect of ultra-violet light, may be incorporated into the polymer. Such other stabilizers are usually incorporated into the polymer before the polymer is initially formed into pellets. Examples of ultraviolet stabilizers are 2-hydroxy-4-n-octoxybenzophenone, 2-(3'-tert.butyl-2'-hydroxy-5'-methylphenyl)-5-chlorobenzotriazole, bis-(2,2,6,6-tetramethyl-4-piperidyl)sebacate and poly-(N-hydroxyethyl-2-2,6,6-tetramethyl4-hydroxypiperidyl)succinate.

The polymers produced by the process of the present invention are capable of being fabricated into a wide variety of articles, as is known for homopolymers of ethylene and copolymers of ethylene and higher alpha-olefins. The present invention provides such polymers of improved colour, especially when the polymers contain ultra-violet or related stabilizers.

Unless otherwise noted, in the examples hereinafter the following procedures were used:

The reactor was a 95 ml (depth=15.1 mm, diameter=88.9 mm) pressure vessel fitted with a six-bladed agitator having a diameter of 66.7 mm, a heating jacket, pressure and temperature controllers, three feed lines and an outlet line. Two of the feed lines were located adjacent to the tips of the agitator blades while the other feed line and the outlet line were adjacent to the centre of the agitator. The catalyst precursors and other ingredients were prepared as solutions in cyclohexane which had been purified, to remove water, oxygen, carbon dioxide and other oxygenated compounds. The monomer(s) was metered directly into the reactor. The rates of feed of the first and second components of the catalyst were adjusted to produce the desired conditions in the reactor.

The reactor effluent was passed through 4.57 mm internal diameter (ID) tubing heated to a temperature of 296° C. prior to injection of the first deactivator. The hold-up time in the tubing was about 0.2 minutes. After injection of a first deactivator, the resultant stream was passed through a further length of 4.57 mm ID tubing, which was heated to 320° C., for a hold-up time of about 2.8 minutes. A second deactivator was then injected into the stream. The deactivated polymer stream thus obtained was maintained at 320° C. for about 1.2 minutes and then flashed into the barrel of a ram extruder heated to about 220° C., the gaseous matter obtained being removed from the extruder. The molten polymer obtained was periodically extruded into a mould having a depth of 1 mm and a diameter of 40 mm and then rapidly cooled to ambient temperature. The plaques thus obtained were then stripped for eight hours with a mixture of saturated steam and air (7:1, by volume) at atmospheric pressure and then dried for 4 hours using air at 100° C. The colour of the plaques was then measured on a Hunter* L,a,b colorimeter, the measurement being on individual plaques using a white background.
*denotes trade mark The present invention is illustrated by the following examples. The solvent used in the examples was cyclohexane.

EXAMPLE I

The catalyst was prepared by in-line mixing of (i) a solution of titanium tetrachoride (0.5 mmoles/liter) and vanadium oxytrichoride (0.5 mmoles/liter) in cyclohexane with (ii) a solution of 1.9 mmoles/liter of diethylaluminum chloride in cyclohexane, the atomic ratio of aluminum to titanium plus vanadium being 1.67:1. After about 20 seconds, a stream of hot cyclohexane was injected into the catalyst mixture, the resultant stream having a temperature of 220° C. The stream was maintained at this temperature for one minute.

The catalyst obtained using the above procedure was fed into the reactor. The co-catalyst of triethyl dimethyl siloxalane was also fed to the reactor. The co-catalyst was used as a 4.0 mmole/liter solution in cyclohexane and the rate of feed to the reactor was the same as that of the solution of the transition metal mixture (i) above. The monomer was ethylene. The reactor effluent was treated as described hereinbefore.

The first deactivator was dimethyl carbonate which was injected as a 30 mmole/liter solution in cyclohexane. The rate of injection was such that the molar ratio of dimethyl carbonate to chlorine plus alkyl radicals in the catalyst was 0.35:1. The second deactivator was a 2.6:1 admixture (molar basis) of a deactivating agent, as specified in Table I below, and a non-stoichiometric mixture of calcium caprylate/caprate, the calcium caprylate/caprate solution being injected as a 6 mmole/liter solution in cyclohexane; the ratio of calcium to chlorine plus alkyl radicals in the catalyst was 0.18:1.

Immediately prior to the flashing of the polymer solution into the extruder, a polymer additive solution containing octadecyl 3-(3,5-di-tert.butyl-4-hydroxyphenyl)propionate, tris(2,4-di-tert.butylphenyl)phosphite, poly-(N-hydroxyethyl-2,2,6,6-tetramethyl-4-hydroxy piperidyl succiate) and 2-hydroxy-4-n-octoxybenzophenone stabilizers, in a ratio of 1.5:1:3.67:1.22 and at a total concentration of 3.1% by weight, in toluene was injected into the polymer solution at a rate such that the concentration of stabilizers in the polymer was 5440 ppm. Further details and the results obtained are given in Table I. The runs were made in the sequence shown in Table I.

TABLE I

| Run No. | Deactivating Agent* | Colour | |
|---|---|---|---|
| | | "a" value | "b" value |
| 1 | Ca caprylate/caprate | −1.53 | 3.01 |
| 2 | triisopropanolamine | −1.24 | 2.26 |
| 3 | octadecyldiethanolamine | −1.56 | 3.68 |
| 4 | Ca caprylate/caprate | −1.46 | 2.75 |
| 5 | diethanolisopropanolamine | −1.18 | 2.31 |
| 6 | N,N—bis(2-hydroxyethyl) soyamine | −1.63 | 3.8 |
| 7 | Ca caprylate/caprate | −1.55 | 3.05 |
| 8 | tris(3,6-dioxaheptyl) amine | −1.47 | 3.06 |
| 9 | triisopropanolamine | −1.25 | 2.33 |
| 10 | N,N,N',N'—tetrakis (2-hydroxypropyl)ethylene diamine | −1.49 | 5.62 |
| 11 | Ca caprylate/caprate | −1.48 | 3.17 |
| 12 | triethanolamine | −1.2 | 2.87 |

*a Ca caprylate/caprate is the "control" deactivating agent, the second deactivator being a solution of calcium caprylate/caprate, which was used at a ratio of calcium to chlorine plus alkyl radicals of 0.35:1.
b octadecyldiethanolamine is available commercially as Ethomeen** 18/12 from Armak Co., Industrial Chemicals Division.
c N,N—bis(2-hydroxyethyl)soyamine is available commerically as Ethomeen S/12.
d Only Runs 2, 5 and 9 are of the present invention; all other runs are comparative runs.

This example illustrates that only deactivating agents of the invention show significant improvements in the colour of the polymer, especially as measured by the "b" or yellowness value.

EXAMPLE II

The procedure of Example I was repeated except that the first and second deactivating agents were replaced with a sole deactivating agent which was dissolved in toluene solvent. The sole deactivating agent was injected into the process such that the molar ratio of deactivating agent to chlorine plus alkyl radicals in the catalyst was 0.47:1.

Further details and the results obtained are given in Table II. The runs were made in the sequence shown in Table II.

TABLE II

| Run No.* | Deactivating Agent | Colour | |
|---|---|---|---|
| | | "a" value | "b" value |
| 13 | triethanolamine | −1.18 | 3.13 |
| 14 | trisopropanolamine | −1.21 | 2.34 |
| 15 | octadecyldiethanolamine | −1.37 | 4.78 |
| 16 | diethanolisopropanolamine | −1.19 | 2.68 |
| 17 | tris(3,6-dioxaheptyl)amine | −1.22 | 3.56 |

*Runs 13, 15 and 17 are comparative runs.

As in Example I only triisopropanolamine and diethanolisopropanolamine exhibited significantly superior performance in producing polymer of acceptable colour.

EXAMPLE III

Using the procedure of Example I of the aforementioned European patent publication No. 193 263 of V. G. Zboril and R. A. Zelonka, the effect of triisopropanolamine as the first deactivator on the isomerization of butene-1 to butene-2 in the copolymerization of ethylene and butene-1 was investigated. The results obtained were as follows, the runs being carried out in sequence:

TABLE III

| Run No. | First Deactivator | Ratio | Amount of Isomerization (%) |
|---|---|---|---|
| 18 | dimethyl carbonate | 0.42 | 4.3 |
| 19 | triisopropanolamine | 0.65 | 1.3 |
| 20 | dimethyl carbonate | 0.39 | 3.0 |
| 21 | water | 0.78 | 7.8 |
| 22 | water/-triisopropanolamine | 0.78/0.65 | 2.7 |
| 23 | triisopropanolamine | 0.65 | 1.8 |
| 24 | dimethyl carbonate | 0.36 | 3.2 |
| 25 | water | 0.60 | 11.1 |

*moles of first deactivator:moles of chlorine plus alkyl radicals in the catalyst.

This example shows that triisopropanolamine as first deactivator causes less isomerization of butene-1 than the other first deactivators that were tested.

EXAMPLE IV

The procedure of Example I was repeated except that the first deactivator was either dimethyl carbonate or water and a single deactivator was used as the second deactivator.

Further details and the results obtained are given in Table IV. The runs were made in the sequence shown in Table IV.

TABLE IV

| Run No.* | Second Deactivator | Amount of Second Deactivator | Colour "a" value | Colour "b" value |
|---|---|---|---|---|
| 26 | triisopropanolamine | 0.47 | −1.11 | 2.17 |
| 27 | N,N—bis(2-hydroxyethyl)soyamine | 0.47 | −1.46 | 5.35 |
| 28 | triethanolamine | 0.47 | −1.29 | 4.11 |
| 29 | diphenylamine | 0.47 | −1.21 | 3.56 |
| 30 | 2,2'-bipyridine | 0.47 | −1.30 | 3.51 |
| 31 | triisopropanolamine | 0.47 | −1.12 | 2.23 |
| 32 | hexylamine | 0.47 | −1.31 | 3.32 |
| 33 | Ca caprylate/caprate | 0.35 | −1.60 | 3.33 |
| 34 | triisopropanolamine | 0.47 | −1.14 | 2.13 |
| 35 | hexylamine | 0.47 | −1.22 | 3.02 |
| 36 | N,N—bis(2-hydroxyethyl)soyamine | 0.47 | −1.41 | 5.21 |
| 37 | 2,2'-bipyridine | 0.47 | −1.30 | 4.23 |
| 38 | triisopropanolamine | 0.47 | −1.17 | 2.47 |
| 39 | Ca caprylate/caprate | 0.35 | −1.48 | 3.10 |

*Runs 26-33 used dimethyl carbonate as first deactivator, at a molar ratio of dimethyl carbonate to chlorine plus alkyl radicals in catalyst of 0.35.
Runs 34-39 used water as first deactivator, at a molar ratio of water to chlorine plus alkyl radicals in catalyst of 0.53.
Amount of Second Deactivator is molar ratio of second deactivator to chlorine plus alkyl radicals in catalyst.

This example shows that triisopropanolamine gave significant improvement in the colour of the polymer obtained.

EXAMPLE V

Ethylene and either butene-1 or octene-1 were fed to a polymerization reactor and copolymerized in the presence of cyclohexane solvent and a catalyst. The catalyst was prepared using the procedure of Example I by admixing titanium tetrachloride/vanadium oxytrichloride with diethylaluminum chloride, heat treating, admixing with triethyl dimethyl siloxalane and feeding to the reactor without separation of any of the catalyst components. The catalyst components were fed at substantially the same rate, by volume.

The monomers were polymerized under solution polymerization conditions. The reaction mixture passing from the reactor was deactivated and polymer was recovered from the resultant solution without separation of the deactivated catalyst. A mixture of additives viz, either antioxidant/ultraviolet (A/U) stabilizer or antioxidant/silica/slip agent (A/S), were added to the molten polymer. The polymer was recovered in the form of pellets and the pellets were treated with either steam (S) or a mixture of steam and air (SA) in order to reduce the level of residual cyclohexane solvent in the pellets.

In the deactivation of catalyst, deactivator was injected at one or both of two inlet ports, which were sequentially located in the apparatus.

Further details and the results obtained are given in Table V.

This example illustrates the use of deactivators of the present invention, in comparison with other deactivators for solution processes.

TABLE V

| Run No.* | 40 | 41 | 42 | 43 | 44 | 45 |
|---|---|---|---|---|---|---|
| Comonomer | C4 | C4 | C4 | C4 | C4 | C4 |
| Catalyst | | | | | | |
| Ti | 0.31 | 0.31 | 0.31 | 0.31 | 0.31 | 0.34 |
| V | 0.34 | 0.34 | 0.34 | 0.34 | 0.34 | 0.37 |
| DEAC | 1.02 | 0.79 | 0.79 | 0.79 | 0.84 | 1.07 |
| Siloxalane | 3.86 | 2.93 | 3.03 | 3.06 | 3.10 | 3.59 |
| Deactivator | | | | | | |
| First Port | A | A | A | A | A/B | A |
| Second Port | — | — | — | B | — | — |
| Deact. Conc. | | | | | | |
| First Port | 0.49 | 0.49 | 0.32 | 0.32 | 0.34/0.25 | 0.25 |
| Second Port | — | — | — | 0.25 | — | — |
| Polymer | | | | | | |
| Density | 0.924 | 0.924 | 0.924 | 0.924 | 0.924 | 0.921 |
| Melt Index | 4.9 | 4.8 | 5.0 | 4.9 | 4.7 | 1.4 |
| Comonomer Content (%) | 7.8 | 7.8 | 7.8 | 7.8 | 7.8 | 7.8 |
| Colour | | | | | | |
| L | 74.8 | 74.5 | 76.0 | 75.9 | 75.4 | 71.4 |
| b | 0.10 | 0.07 | 0.22 | 0.16 | 0.48 | 2.06 |
| Stripping Method | SA | S | SA | SA | SA | SA |
| Additives | A/U | A/U | A/U | A/U | A/U | A/S |
| Run No.* | 46 | 47 | 48 | 49 | 50 | 51 |
| Comonomer | C4 | C4 | C4 | C8 | C8 | C8 |
| Catalyst | | | | | | |
| Ti | 0.20 | 0.21 | 0.20 | 0.54 | 0.43 | 0.42 |
| V | 0.24 | 0.20 | 0.24 | 0.58 | 0.66 | 0.64 |
| DEAC | 0.75 | 0.82 | 0.83 | 1.73 | 1.56 | 1.52 |
| Siloxalane | 2.83 | 2.79 | 2.70 | 5.80 | 4.73 | 4.62 |
| Deactivator | | | | | | |
| First Port | C | C | C | A | A | A |
| Second Port | A | D | — | — | — | A |
| Deact. Conc. | | | | | | |
| First Port | 0.34 | 0.37 | 0.37 | 0.43 | 0.30 | 0.11 |
| Second Port | 0.47 | 1.3 | — | — | — | 0.22 |
| Polymer | | | | | | |
| Density | 0.921 | 0.921 | 0.921 | 0.927 | 0.927 | 0.925 |
| Melt Index | 1.5 | 1.3 | 1.5 | 1.0 | 1.1 | 1.1 |
| Comonomer Content (%) | 7.8 | 7.8 | 7.8 | 6.3 | 6.3 | 6.3 |
| Colour | | | | | | |
| L | 70.5 | 69.7 | 68.0 | 72.0 | 66.7 | 69.9 |
| b | 0.42 | 2.25 | 3.31 | 5.67 | 5.70 | 3.97 |
| Stripping Method | SA | SA | SA | SA | S | S |

TABLE V-continued

| Additives | A/S | A/S | A/S | A/S | A/S | A/S |
|---|---|---|---|---|---|---|

*Catalyst concentration is reported in mmole/l
DEAC = diethylaluminum chloride;
The deactivators were as follows:
A = triisopropanolamine;
B = water;
C = dimethyl carbonate;
D = calcium caprylate/caprate: The deactivator concentration is expressed in moles of deactivating agent/moles of halogen plus alkyl plus $R_3SiO$, the latter being from the siloxalane;
Polymer density expressed in $g/cm^3$
Melt index expressed in dg/min;
L and b colour values were measured using the Hunter Colorimeter and the procedure described above, except that the measurements were conducted on 100 ml samples of pellets instead of on plaques.

We claim:

1. A solution polymerization process for the preparation of high molecular weight polymers of alpha-olefins selected from the group consisting of homopolymers of ethylene and copolymers of ethylene and $C_3-C_{12}$ hydrocarbon alpha-olefins, said process comprising feeding monomer selected from the group consisting of ethylene and mixtures of ethylene and at least one $C_3-C_{12}$ hydrocarbon alpha-olefin, a coordination catalyst and inert hydrocarbon solvent to a reactor, said catalyst being a titanium-based and/or vanadium-based coordination catalyst containing halogen and/or alkyl radicals, polymerizing said monomer at a temperature of 105° to 320° C. and a pressure of less than 25 MPa, deactivating the catalyst by admixing the solution passing from the reactor with at least one trialkanolamine deactivating agent of the formula $N(ROH)(R'OH)_2$, where R is isopropyl and R' is alkyl of 2-4 carbon atoms, without taking steps to physically separate the deactivated catalyst from the solution, separating the hydrocarbon solvent and other volatile matter from the resultant solution, and recovering a composition of said high molecular weight polymer, the amount of deactivating agent being not more than 2.5 moles of deactivating agent per mole of halogen plus alkyl radicals in the coordination catalyst.

2. The process of claim 1 in which the trialkanolamine is the sole deactivator.

3. The process of claim 1 in which the coordination catalyst is deactivated by sequentially admixing said reactor solution with trialkanolamine and then with a solution of a salt of an alkaline earth metal or zinc with aliphatic monocarboxylic acid, said salt being dissolved in hydrocarbon solvent.

4. The process of claim 1 in which the coordination catalyst is deactivated by admixing said reactor solution with each of (a) a minor amount of a deactivating agent selected from the group consisting of water, a nitrogenous base, carbon dioxide, carbon monoxide, dialkyl carbonate and dioxolones, and mixtures thereof, and (b) trialkanolamine, said nitrogenous base being of the formula $NR^2R^3R^4$, where $R^2$, $R^3$ and $R^4$ are independently selected from the group consisting of H, saturated alkyls having 1-20 carbon atoms and $-SiR^5R^6R^7$ where each of $R^5$, $R^{67}$ and $R^7$ is independently selected from saturated alkyls having 1-20 carbon atoms, with the proviso that the nitrogenous base does not contain more than two $-SiR^5R^6R^7$ groups, said dialkyl carbonate having 3-20 carbon atoms and said dioxolones having 3-20 carbon atoms.

5. The process of claim 4 in which the deactivator of (a) is admixed with said reactor solution prior to the deactivator of (b).

6. The process of claim 4 in which the deactivator of (b) is admixed with said reactor solution prior to the deactivator of (a).

7. The process of claim 4 in which the deactivators of (a) and (b) are simultaneously admixed with said reactor solution.

8. The process of claim 4 in which the trialkanolamine is admixed with a solution of a salt of an alkaline earth metal or zinc with aliphatic monocarboxylic acids, said salt being dissolved in hydrocarbon solvent.

9. The process of claim 1 in which both of the R' groups of the trialkanolamine are isopropyl.

10. The process of claim 1 in which both of the R' groups of the trialkanolamine are ethyl.

11. The process of claim 1 in which the trialkanolamine is a mixture of trialkanolamines of said formula.

* * * * *

UNITED STATES PATENT AND TRADEMARK OFFICE
CERTIFICATE OF CORRECTION

PATENT NO. : 4,803,259

DATED : February 7, 1989

INVENTOR(S) : Vaclav G. Zboril et al

It is certified that error appears in the above-identified patent and that said Letters Patent is hereby corrected as shown below:

Column 12, claim 4, line 19, "$R^{67}$" should read -- $R^6$ --.

Signed and Sealed this

Twentieth Day of June, 1989

Attest:

DONALD J. QUIGG

Attesting Officer

Commissioner of Patents and Trademarks